US012681808B2

(12) United States Patent
Shimamawari

(10) Patent No.: US 12,681,808 B2
(45) Date of Patent: Jul. 14, 2026

(54) DEVICE MANAGEMENT SYSTEM AND METHOD OF CONTROLLING DEVICE MANAGEMENT SYSTEM

(71) Applicant: CANON KABUSHIKI KAISHA, Tokyo (JP)

(72) Inventor: Takuji Shimamawari, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 18/492,454

(22) Filed: Oct. 23, 2023

(65) Prior Publication Data

US 2024/0134752 A1 Apr. 25, 2024
US 2024/0232023 A9 Jul. 11, 2024

(30) Foreign Application Priority Data

Oct. 25, 2022 (JP) ................................. 2022-170910

(51) Int. Cl.
*G06F 11/1446* (2026.01)
(52) U.S. Cl.
CPC ...... *G06F 11/1464* (2013.01); *G06F 11/1448* (2013.01); *G06F 11/1469* (2013.01)
(58) Field of Classification Search
CPC ............. G06F 11/1464; G06F 11/1448; G06F 11/1469
See application file for complete search history.

(56) References Cited

U.S. PATENT DOCUMENTS

| | | | | |
|---|---|---|---|---|
| 11,709,741 B1* | 7/2023 | Uppal | ................. | G06F 11/0709 714/4.11 |
| 2011/0211228 A1* | 9/2011 | Asahara | ............... | G06K 15/402 358/1.16 |
| 2016/0034359 A1* | 2/2016 | Cabrera | .............. | G06F 11/0793 714/19 |
| 2016/0294610 A1* | 10/2016 | Yang | ........................ | H04L 43/16 |
| 2019/0250996 A1* | 8/2019 | Shiihara | .............. | G06F 11/1469 |
| 2020/0301786 A1* | 9/2020 | Uragaki | ................ | G06F 3/0619 |
| 2021/0312881 A1* | 10/2021 | Kamekura | .......... | G06F 3/04162 |

FOREIGN PATENT DOCUMENTS

JP 2011180753 A 9/2011

\* cited by examiner

*Primary Examiner* — Rocio Del Mar Perez-Velez
*Assistant Examiner* — Jonah C Krieger
(74) *Attorney, Agent, or Firm* — Canon U.S.A., Inc. IP Division

(57) ABSTRACT

In a case where a backup management unit of an image forming apparatus detects a change in a setup environment of the image forming apparatus, the backup management unit transmits information of changed setting values and information of the setup environment to a backup management server. A data management unit of the backup management server associates the setting information received from the image forming apparatus with the setup environment information, and stores and manages the information in a backup database as backup data of the image forming apparatus.

7 Claims, 12 Drawing Sheets

FIG. 6

| SERIAL NUMBER | ACQUIRED DATE | FILE NAME | SETUP ENVIRONMENT ID |
|---|---|---|---|
| ABC00001 | 2022/06/01 18:00:00 | ABC00001_20220601.bak | 3 |
| ABC00002 | 2022/06/03 15:00:00 | ABC00002_20220603.bak | 1 |
| ABC00003 | 2022/06/07 12:00:00 | ABC00002_20220607.bak | 6 |

FIG. 8A

| SERIAL NUMBER 610 | ACQUIRED DATE 611 | FILE NAME 612 | SETUP ENVIRONMENT ID 613 |
|---|---|---|---|
| ABC00001 | 2022/06/01 18:00:00 | ABC00001_20220601.bak | 3 |
| | 2022/06/08 18:00:00 | ABC00001_20220608.bak | 3 |
| | 2022/06/15 18:00:00 | ABC00001_20220615.bak | 3 |
| ABC00002 | 2022/06/03 18:00:00 | ABC00002_20220603.bak | 1 |
| | 2022/06/10 18:00:00 | ABC00002_20220610.bak | 1 |
| | 2022/06/17 18:00:00 | ABC00002_20220617.bak | 1 |

FIG. 8B

| SERIAL NUMBER 610 | ACQUIRED DATE 611 | FILE NAME 612 | SETUP ENVIRONMENT ID 613 |
|---|---|---|---|
| ABC00001 | 2022/06/18 10:25:38 | ABC00001_20220618.bak | 2 |
| ABC00002 | 2022/06/03 18:00:00 | ABC00002_20220603.bak | 1 |
| | 2022/06/10 18:00:00 | ABC00002_20220610.bak | 1 |
| | 2022/06/17 18:00:00 | ABC00002_20220617.bak | 1 |

DEVICE MANAGEMENT SYSTEM AND METHOD OF CONTROLLING DEVICE MANAGEMENT SYSTEM

BACKGROUND

Field

The present disclosure relates to a device management system and a method of controlling the device management system.

Description of the Related Art

The image forming apparatus has a function of storing and managing various kinds of configuration information such as setting values in a storage device. In recent years, a usage form in which an image forming apparatus is connected to an external server and setting information of the image forming apparatus is stored in the external server as backup data has become common. This allows to restore the configuration of the image processing apparatus to a state at a specific point in time at an arbitrary timing.

In general, the backup data storage processing is often executed periodically at a specific cycle (for example, every week). Therefore, a state of the image forming apparatus when executing the backup may be different from a state of the image forming apparatus when executing restoration. Therefore, if all the setting information is simply restored based on the backup data, the state of the image forming apparatus may be rewound more than necessary. Japanese Patent Application Laid-Open No. 2011-180753 discloses defining setting values essential for restoration in advance, and restoring only necessary setting values.

In recent years, image forming apparatuses have been installed in various environments such as an in-house intranet (intra-office) environment and a direct Internet connection environment. As a result, the required settings have become more complex. In particular, it is important to perform security settings in accordance with the installation (setup) environments in order to protect the image forming apparatus from a threat of attack.

However, in the related art, the backup data is not managed in consideration of the setup environments of the image forming apparatus and the change thereof. As a result, if the backup data is easily used for restoration after the setup environment of the image forming apparatus has changed, settings that are not suitable for the current setup environment may be applied.

SUMMARY

A device management system according to embodiments of the present disclosure comprises: a network device; and a device management service that manages setting information including a plurality of setting values for the network device as backup data, wherein the network device includes: a selecting unit that selects a setup environment of the network device from a plurality of setup environments; a setting unit that sets, for the network device, predetermined one or multiple setting values corresponding to a setup environment selected by the selecting unit; and a backup unit that transmits, to the device management service, the setting information after being set by the setting unit and information of the setup environment selected by the selecting unit, wherein the device management service includes a storage unit that stores the setting information and the information of the setup environment as first backup data of the network device, the setting information and the information of the setup environment being received from the network device.

Further features of the present disclosure will become apparent from the following descriptions of the exemplary embodiments with reference to the attached drawings.

BRIEF DESCRIPTION OF THE DRAWINGS

FIG. 6 shows a backup management table stored in a backup database according to one or more aspects of the present disclosure.

FIG. 8A shows a backup management table stored in a backup database according to one or more aspects of the present disclosure.

FIG. 8B shows a backup management table stored in a backup database according to one or more aspects of the present disclosure.

DESCRIPTION OF THE EMBODIMENTS

Figure 1:
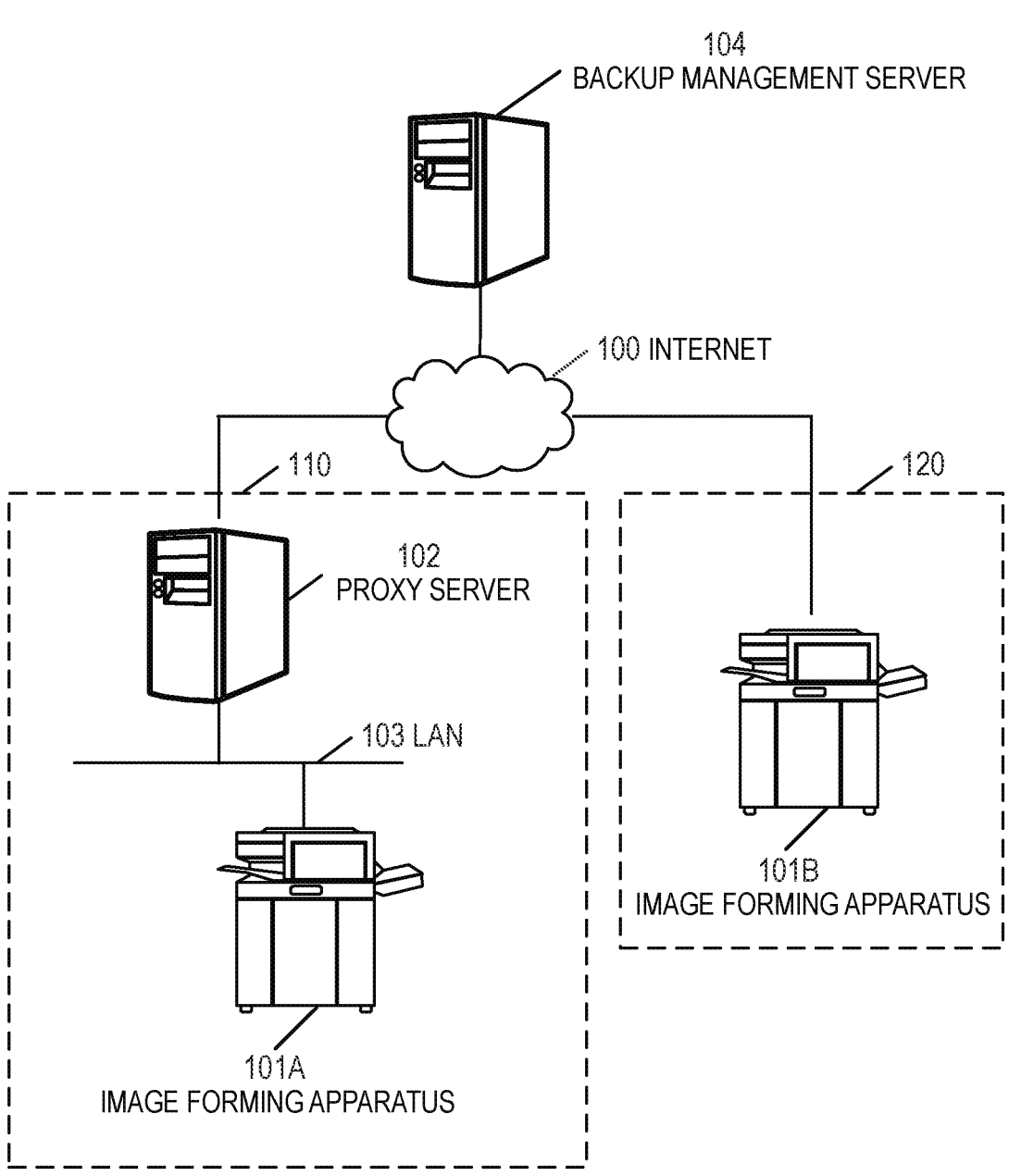
FIG. 1 shows a device management system according to one or more aspects of the present disclosure.

Each embodiment will be described below with reference to the drawings. In the description of each embodiment, the same components as those of other embodiments may be indicated by the same reference numerals and the description thereof may be omitted.

First Embodiment

FIG. 1 is a diagram showing an example of a device management system according to an embodiment of the present disclosure. Image forming apparatuses 101A and 101B as network devices according to the present exemplary embodiment are installed in different installation (setup) environments 110 and 120, respectively. The setup environment 110 shown in in FIG. 1 corresponds to an in-house intranet (intra-office) environment. The setup environment 120 corresponds to a direct Internet connection environment 120.

The in-house intranet environment 110 is an environment in which the image forming apparatus 101 is connected via an in-house local area network (LAN) 103. A proxy server 102 is installed at the boundary between the LAN103 and the Internet 100. That is, the communication between the image forming apparatus 101A in the in-house intranet environment 110 and the Internet 100 is monitored and protected by the proxy server 102. Therefore, in the in-house intranet environment 110, a threat such as access to the image forming apparatus 101A by an attacker via the Internet 100 is significantly reduced.

On the other hand, no proxy server is installed in the direct Internet connection environment 120. In the direct Internet connection environment 120, the image forming apparatuses 101 are directly connected to the Internet 100 to perform communications. As a result, the image forming apparatus 101B in the direct Internet connection environment 120 requires a countermeasure against a threat such as access by an attacker via the Internet 100 by using a personal firewall function inside the image forming apparatus 101B.

The image forming apparatuses 101 are connected to the backup management server 104 via the Internet 100. The backup management server 104 communicates with the image forming apparatuses 101 to transmit and receive backup data. The backup management server 104 provides a device management service for managing setting information including a plurality of setting values of the image forming apparatuses 101 as backup data. The backup management server 104 may be realized by one computer or may be realized by a plurality of computers. For example, the backup management server 104 may be implemented using a cloud computing technology.

In the present embodiment, in addition to the in-house intranet environment 110 and the direct Internet connection environment 120, a public network environment, a private (home) environment, a highly confidential information management environment, and an Internet connection prohibited environment (not shown) are considered as setup environments. The security setting to be set in the image forming apparatus is different for each of the six types of setup environments. For example, the file sharing function is used for sharing a file on a network in the environments. Therefore, in an environment where unspecified users share a network of the environment, it is desirable to disable the file sharing function in order to prevent information leakage. That is, it is recommended to disable the file sharing function except for private network environments in which specific users share a network of the environments.

In the above six setup environments, the private network environments correspond to the in-house intranet environment 110, the Internet connection prohibited environment, and the home environment. Therefore, it is recommended to disable the file sharing function for the other environments, that is, the direct Internet connection environment 120, the public space environment, and the highly confidential information management environment. An example of the settings related to the file sharing function is a server message block (SMB) setting.

The definitions of the setup environments are not limited to the above six setting environments. Some of the exemplified environments shown in the present embodiment or other additional setup environments may be defined. For example, it is considered that the image forming apparatus is installed in a company, and the setup environment may be classified for each type of industries such as finance or government office.

Figure 2:
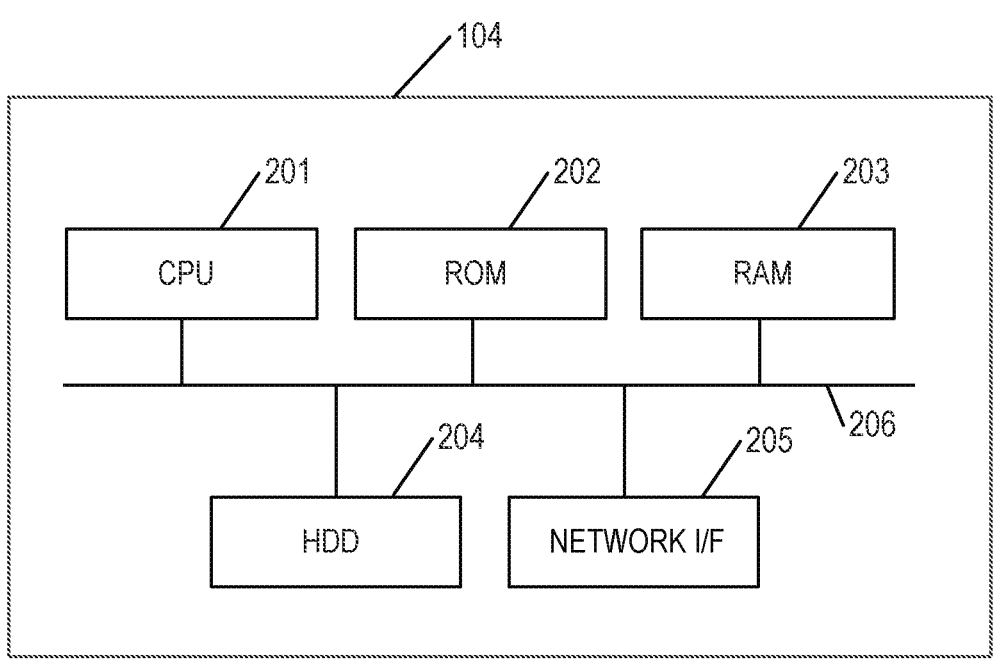
FIG. 2 shows a hardware configuration of an information processing apparatus capable of configuring a backup management server according to one or more aspects of the present disclosure.

FIG. 2 is a diagram showing an example of a hardware configuration of an information processing apparatus that can configure the backup management server 104. The backup management server 104 includes a CPU201, a ROM202, a RAM203, a HDD204, and a network interface (UF) 205.

The CPU201 reads a control program stored in the ROM202 and executes various types of control. The control includes executing a program for realizing a flowchart described below.

The RAM203 is a main memory of the CPU201 and is used as a temporary storage area such as a work area. The HDD204 stores various types of data and programs. The backup management server 104 may include another storage device such as a solid state drive (SSD) instead of or in combination with a hard disk drive (HDD). The network I/FF205 connects the backup management server 104 to a network, and transmits and receives various types of information to and from other apparatuses via the network.

The backup management server 104 can communicate with information processing apparatuses including the image forming apparatuses 101 and proxy server 102 even if the backup management server 104 has no user interface. Thus, no user interface is shown in FIG. 2. However, the backup management server 104 may include hardware such as a keyboard, a pointing device, and a display device.

Figure 3:
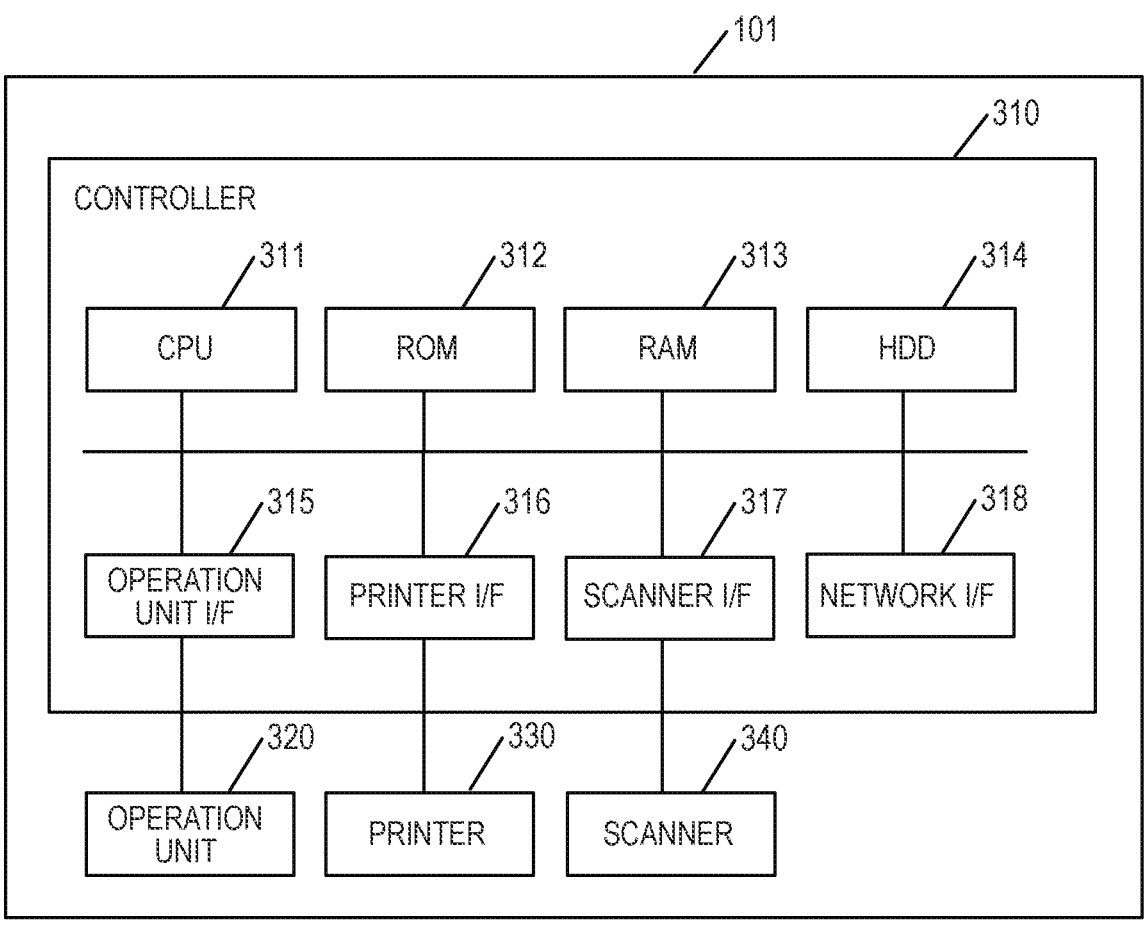
FIG. 3 shows a hardware configuration of the image forming apparatus according to one or more aspects of the present disclosure.

FIG. 3 is a diagram showing an example of a hardware configuration of the image forming apparatus 101. The image forming apparatus 101 includes a control unit 310, an operation unit 320, a printer 330, and a scanner 340. The control unit 310 includes a CPU 311, an ROM 312, an RAM 312, an HDD 314, an operation unit I/F 315, a printer I/F 316, a scanner I/F 317, and a network I/F 318. The control unit 310 including the CPU 311 controls the overall operation of the image forming apparatus 101. The ROM 312 is used to store programs to be executed by the CPU 311. The CPU 311 reads out a control program stored in the ROM 312 and performs various controls for the image forming apparatus 101 including reading control and transmission controls. The control includes executing a program for realizing a flowchart described later. The RAM 313 is used as a main memory of the CPU 311 and as a temporary storage area such as a work area. The HDD 314 is a storage device that stores image data, various programs, and various setting information. The image forming apparatus 101 may include another storage device such as an SSD instead of or in combination with the HDD.

The operation unit I/F315 connects the operation unit 320 and the control unit 310. The operation unit 320 includes a liquid crystal display unit having a touch panel function, various hard keys, and the like. The operation unit 320 functions as a display unit that displays information to the user and a reception unit that receives instructions from the user.

The printer I/F316 connects the printer 330 and the control unit 310. Image data to be printed by the printer 330 is transferred from the control unit 310 via the printer I/F. The input image data is output onto a recording medium by the printer 330. The scanner I/F317 connects the scanner 340 and the control unit 310. The scanner 340 reads a document placed on a document table (not shown) and generates image data. The generated image is input to the control unit 310 via the scanner I/F317.

A network cable is connected to the network I/F 318, and the image forming apparatus 101 can communicate with external apparatuses connected to the LAN 103. In the present embodiment, the network I/F 318 is considered to be a communication interface that performs wired communications. However, the communication interface of the present disclosure is not limited to wired communications, and may be, for example, a wireless communication interface. The network I/F 318 of the image forming apparatus 101A is connected to the LAN 103. However, the networks connected via the network I/F 318 are different depending on the setup environments. For example, the image forming apparatus 101B is directly connected to the Internet 100.

Figure 4A:
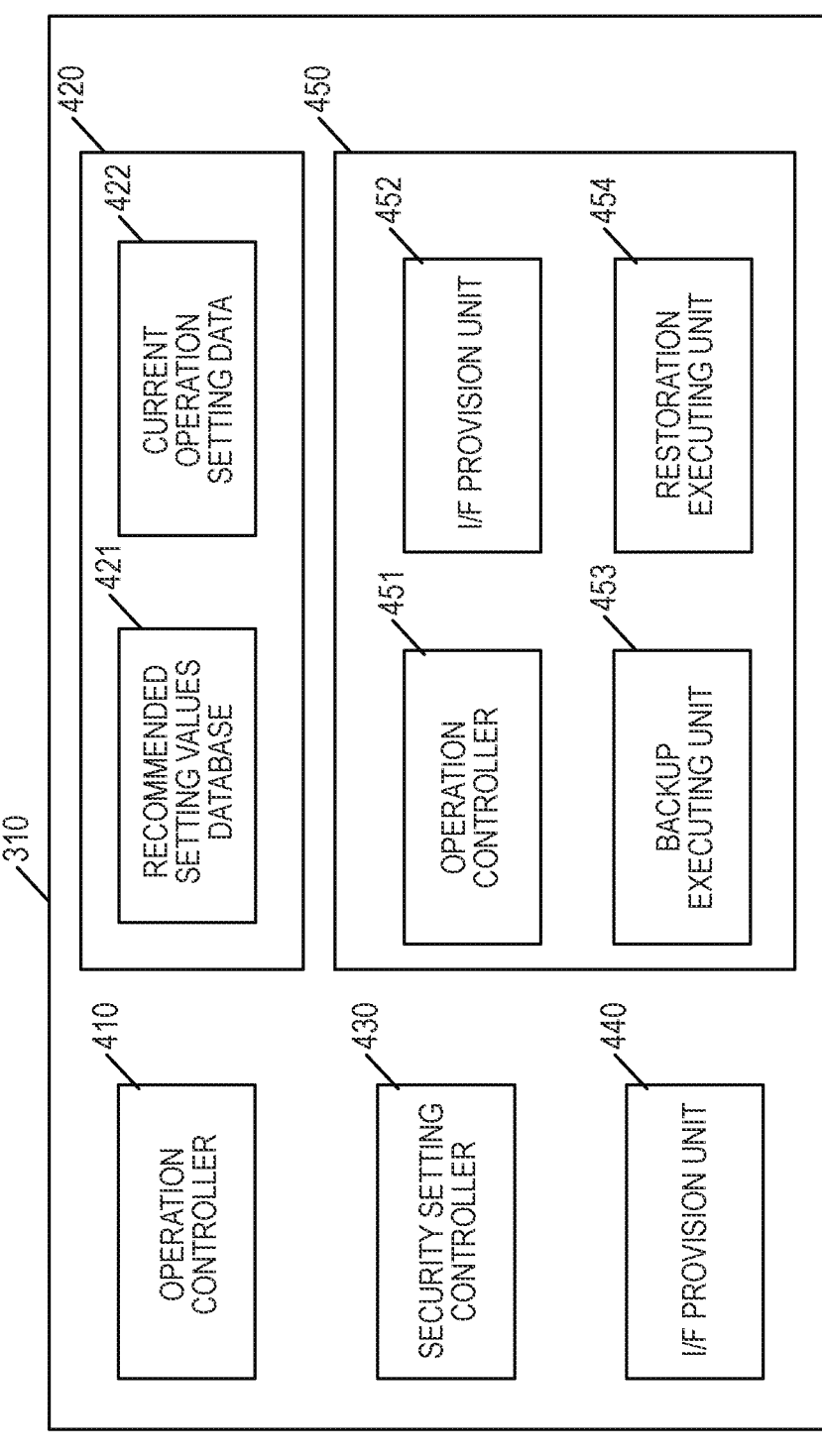
FIG. 4A shows a software configuration of the image forming apparatus according to one or more aspects of the present disclosure.

FIG. 4A is a diagram showing an example of a software configuration of the image forming apparatus 101. Each unit shown in FIG. 4A is realized by the CPU 311 executing a program corresponding to each unit stored in the ROM 312.

The control unit 310 includes an operation control unit 410, a data storage unit 420, a security setting control unit 430, an I/F provision unit 440, and a backup management unit 450. The operation control unit 410 displays a screen for a user on the operation unit 320. The operation control unit 410 detects a user's operation, switches the screen based on the detection, and updates the display.

The data storage unit 420 stores data in the HDD 314 and reads data from the HDD 314 in response to a request from another control unit. The data storage unit 420 stores information about settings for determining operations of the image forming apparatus 101 and information about settings of security functions. Specifically, the data storage unit 420 stores a recommended setting value database 421 and current operation setting data 422.

The recommended setting value database 421 is a database in which combinations of setting items and setting values of security functions suitable for the setup environment of the image forming apparatus 101 are associated with setup environments divided into multiple categories. The setting items of the security function represent settings of a security measure such as encryption of communication paths, invalidation of the file sharing function, and the like. Table 1 shows an example of security measures to be implemented in each of the six setup environments.

6

1. In the present embodiment, the recommended setting value database 421 is defined in advance by a vendor of the image forming apparatus 101 and is stored in the data storage unit 420.

The current operation setting data 422 includes an ID indicating a setup environment currently applied to the image forming apparatus 101 and a combination of setting items and setting values. When the settings are changed, the current operation setting data 422 is rewritten. Thereafter, when the image forming apparatus 101 is restarted, rewritten setting data 422 as the current operation setting data 422 is read by the program, and the image forming apparatus 101 operates based on the applied settings.

The security setting control unit 430 receives a setup environment selected by the user from the operation control unit 410. The security setting control unit 430 collectively sets security functions suitable for the selected setting environment. Thereafter, the security setting control unit 430 notifies the backup management unit 450 that the setup environment has been selected by the user.

The I/F provision unit 440 provides an API (Application Programming Interface) necessary for an external program to refer to the data storage unit 420 and instruct the security setting control unit 430 to perform the above processing.

The backup management unit 450 controls backup processing and restoration processing of the setting values applied to the image forming apparatus 101. The operation control unit 451 of the backup management unit 450 displays a screen for the user on the operation unit 320. The user can operate the screen to instruct execution of the backup and restoration processing. The user can also set an interval for performing the backup processing periodically and automatically. The I/F provision unit 452 of the backup management unit 450 provides a backup execution unit 453 with an API necessary for instructing the processing when an external program cooperates with the backup management unit 450.

The backup execution unit 453 executes the backup processing of each setting value applied to the image forming apparatus 101. More specifically, after converting each setting value into a file, the backup execution unit 453 adds some pieces of information, and transmits the file to the

TABLE 1

| | Setup environments | | | | | |
| Setting items | Intranet (intra-office) | Internet connection prohibited | Direct internet connection | Private (home) network | Public network | Confidential information management |
|---|---|---|---|---|---|---|
| Encrypt communication paths | ON | | ON | ON | ON | ON |
| Invalidate legacy protocol | ON | | ON | ON | ON | ON |
| Validate personal firewall | | | ON | ON | ON | ON |
| Strengthen security of authentication | ON | | ON | ON | ON | ON |
| Measure against physical attack | | | | ON | ON | ON |
| Invalidate file sharing | | | ON | | ON | ON |
| Invalidate external storage devices | ON | ON | ON | ON | ON | ON |

The setting values are indicated as "ON" in Table 1. Setting items having a blank setting value in Table 1 indicate that the setting items have no recommended setting value. That is, even if the setup environment is changed, the setting values related to the setting items are not changed, and the setting values used before the setting environment is changed are maintained. The recommended setting value database 421 stores, for each setup environment of the image forming apparatus 101, one or more predetermined setting values suitable for the setup environment, as shown in Table backup management server 104 as backup data. In the present embodiment, the information to be added may be a date and time of the backup processing being executed and an ID for uniquely identifying the image forming apparatus 101 and the corresponding setup environment. The backup processing may be instructed by the user via the operation control unit 451. In addition, the backup processing may be performed periodically at intervals specified by the user. Further, the backup processing may be executed by an external program through the I/F provision unit 452.

A restoration executing unit 454 acquires backup data designated by the user from the backup management server 104, and restores the image forming apparatus 101 based on the backup data.

Figure 4B:
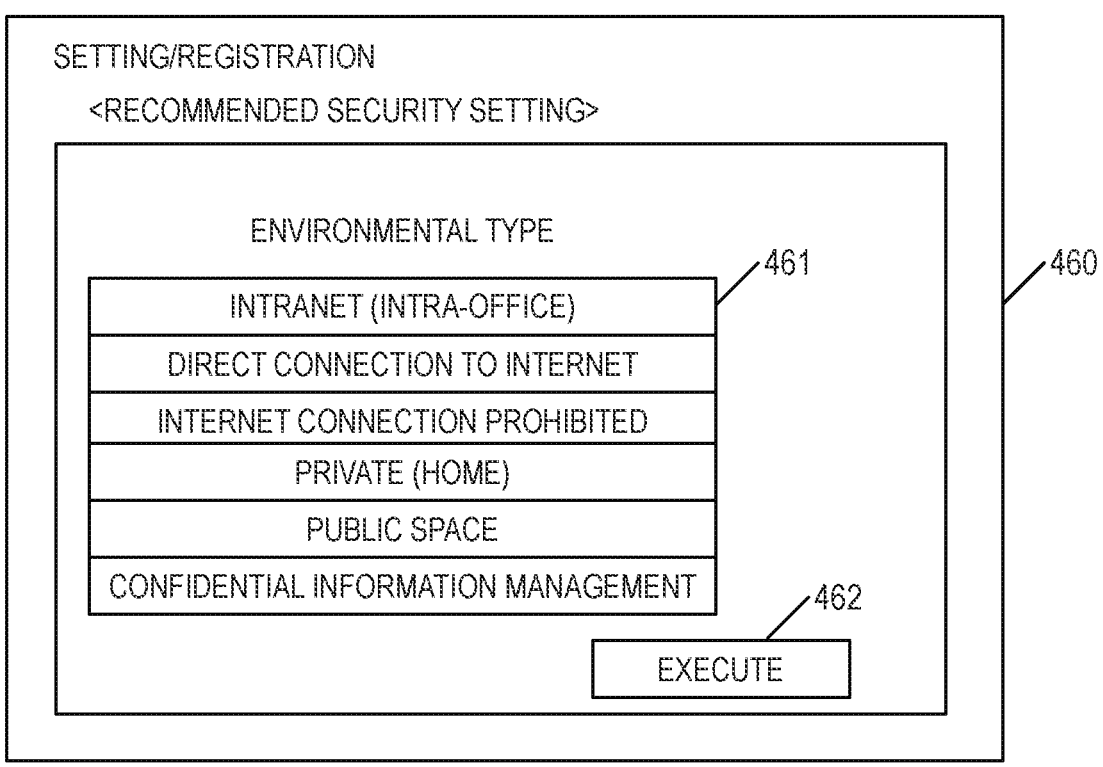
FIG. 4B shows a setting screen of the setup environment of the image forming apparatus according to one or more aspects of the present disclosure.

FIG. 4B shows an example of a setup environment setting screen 460 displayed on the operation unit 320 by the operation control unit 410. The setting screen 460 includes a setup environment list button 461 and an execution button 462. The list button 461 allows the user to select a setup environment. The user selects a setup environment of the image forming apparatus 101 from the setup environment list button 461 on the setting screen 460, and presses the execution button 462.

In the present embodiment, the user selects a setup environment from the six options of setup environments shown in Table 1. The operation control unit 410 of the image forming apparatus 101 detects the user's operation and transmits information indicating the user's selection to the security setting control unit 430. In response to the information, the security setting control unit 430 collectively sets security functions suitable for the setup environment selected by the user.

When an environment corresponding to the situation of the image forming apparatus being installed is selected by an administrator or the like of the image forming apparatus 101, one or a plurality of predetermined setting values (for example, the security settings as described above) suitable for the environment can be collectively set for the image forming apparatus 101.

Thereafter, the security setting control unit 430 notifies the backup management unit 450 that the setup environment has been selected by the user.

Figure 5:
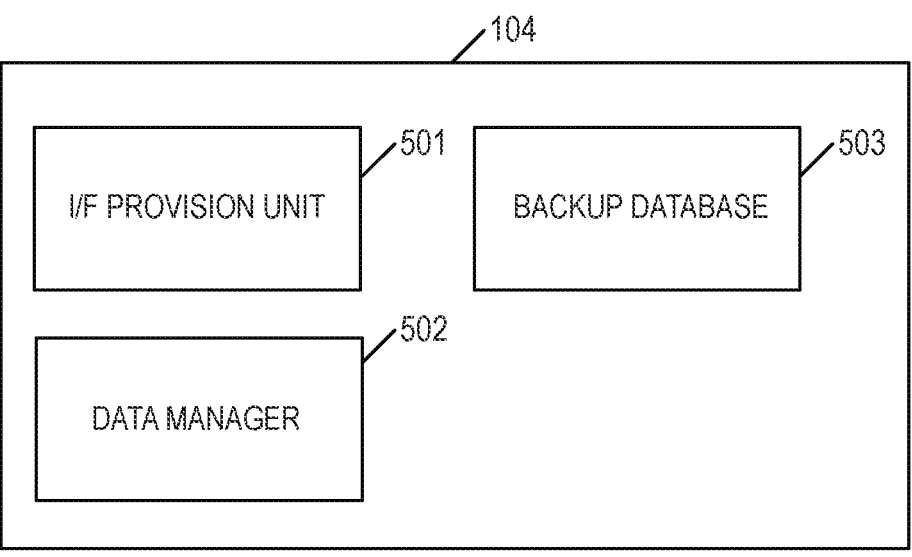
FIG. 5 shows a software configuration of the backup management server according to one or more aspects of the present disclosure.

FIG. 5 is a diagram showing an example of a software configuration of the backup management server 104. Each unit shown in FIG. 5 is realized by the CPU201 executing a program related to each unit that is stored in the ROM202.

The OF provision unit 501 provides an API used by an external information processing apparatus. The API allows the backup management server 104 to transmit and receive data to and from the backup management unit 450.

The data management unit 502 controls operations such as updating and deleting data stored in the backup database 503.

The backup database 503 stores entity files of backup data received from the image forming apparatus 101 via the OF provision unit 501 and a management table for the entity files.

FIG. 6 is a diagram showing an example of a backup management table stored in the backup database 503 of the present embodiment. A serial number 610 is an ID for uniquely identifying the image forming apparatus 101, and indicates from which image forming apparatus 101 the backup data has been acquired. An acquisition date and time 611 indicates the date and time when the backup data was created. A file name 612 indicates a file name of the backup data. A setup environment ID 613 is an ID corresponding to the six setup environments of the present embodiment. The setup environment ID 613 indicates which setup environment was applied to the image forming apparatus 101 at the time when the respective backup data were created.

Figure 7:
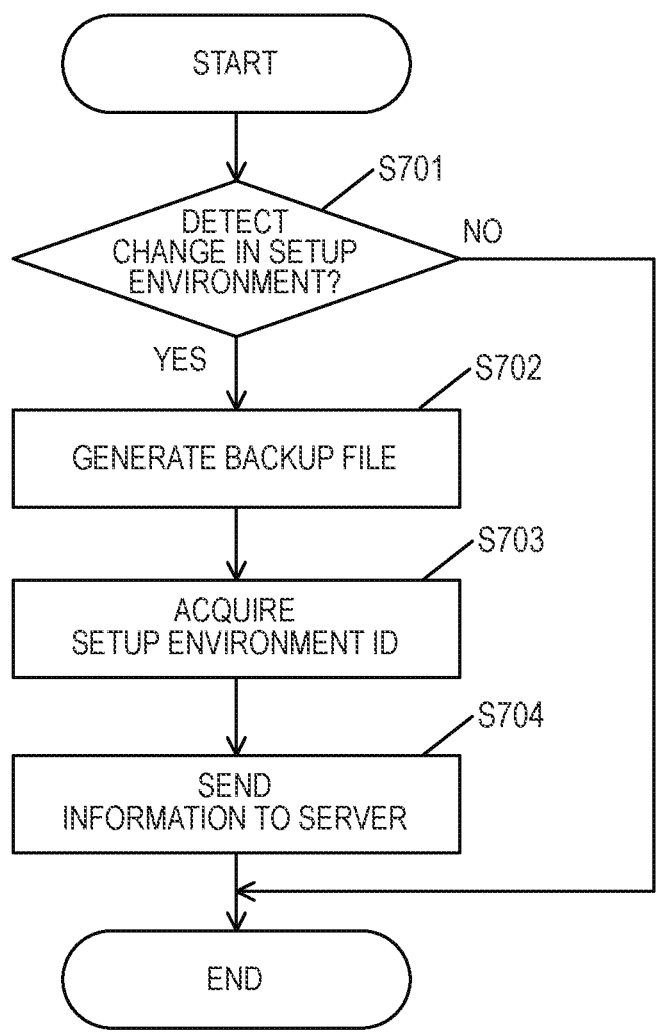
FIG. 7 is a flowchart showing backup processes of the image forming apparatus according to one or more aspects of the present disclosure.

FIG. 7 is a flowchart showing an example of the backup processing performed by the backup management unit 450 of the image forming apparatus 101 according to the first embodiment. Each step of this flowchart is realized by the CPU311 executing a program corresponding to each step stored in the ROM312.

In step S701, the backup execution unit 453 determines whether the setup environment of the image forming apparatus 101 has been changed. According to the present embodiment, in case of the user changing the setup environment via the setup environment setting screen 460, the security setting control unit 430 collectively sets the security functions according to the change in the setup environment. The security setting control unit 430 notifies the backup execution unit 453 via the OF provision unit 452 that the setup environment has been changed. The backup execution unit 453 detects the change in the setup environment based on the notification.

In step S702, the backup execution unit 453 refers to and acquires the current operation setting data 422 via the OF provision unit 440, and creates a backup file including the data 422. In step S703, the backup execution unit 453 refers to the setting data 422 via the OF provision unit 440 and acquires the setup environment ID that is currently set to the image forming apparatus 101.

In step S704, the backup execution unit 453 collectively transmits the backup files created in step S702, the setup environment ID acquired in step S703, and other information to the backup management server 104.

The backup management server 104 receives the backup data and the setup environment ID from the image forming apparatus 101, and associates the backup data with the setup environment ID. The backup management server 104 stores and manages the data shown in FIG. 6 in the backup database 503.

According to the present embodiment, the number of pieces of backup data stored in the backup management server 104 is one for each image forming apparatus (serial number). That is, in case that the backup data of the image forming apparatus 101 has been stored and new backup data of the image forming apparatus 101 is to be stored, the backup management unit 450 deletes the stored old backup data.

When the setup environment of the image forming apparatus 101 is changed and setting values corresponding to the change are collectively set, the backup data of the image forming apparatus 101 is transmitted to the backup management server 104 and stored therein. As a result, the backup data of the image forming apparatus 101 managed by the backup management server 104 is backup data based on the current setup environment of the image forming apparatus 101, that is, backup data based on a setup environment of the image forming apparatus and a change in the setup environment.

According to the present embodiment, executing the backup processing in response to a change in the setup environment of the image forming apparatus allows to manage the backup data based on a setup environment of the image forming apparatus and the change of the setup environment. The above configuration prevents the apparatus from being restored by the user based on backup data created with the setup environment before the change. Therefore, the present embodiment allows to prevent settings (in particular, security settings) that are not suitable for the current setup environment from being applied to the image forming apparatus. As a result, the present embodiment can reduce the risk of the image forming apparatus being exposed to a threat of attack.

Second Embodiment

According to the first embodiment, the backup data stored in the backup management server is the latest data for each image forming apparatus. However, another configuration may be considered in which the backup management server holds multiple pieces of past backup data for each image forming apparatus and a user selects backup data to be used for restoration when restoring the apparatus. In such a case, the backup data created before the setup environment is changed may be selected when restoring the apparatus. According to the second embodiment, backup data is deleted from the backup management server in case that a setup environment of the backup data when created does not match a changed setup environment of the apparatus. In the second embodiment, the configurations shown in FIGS. 1 to 7 are same as those of the first embodiment, and the descriptions of the respective figures are omitted. Hereinafter, differences from the first embodiment will be described.

FIG. 8A shows an example of a backup management table stored in the backup database 503 of the second embodiment. The backup database 503 according to the second embodiment stores, for example, three pieces of past backup data for each image forming apparatus 101.

In case that three pieces of past backup data are stored and new backup data is stored, the oldest backup data is deleted.

The number of pieces of past backup data of each image forming apparatus 101 stored in the backup database 503 is not limited to three. The number of the past backup data may be two, or four or more. An arbitrary number of pieces of backup data may be set for storage.

Figure 9:
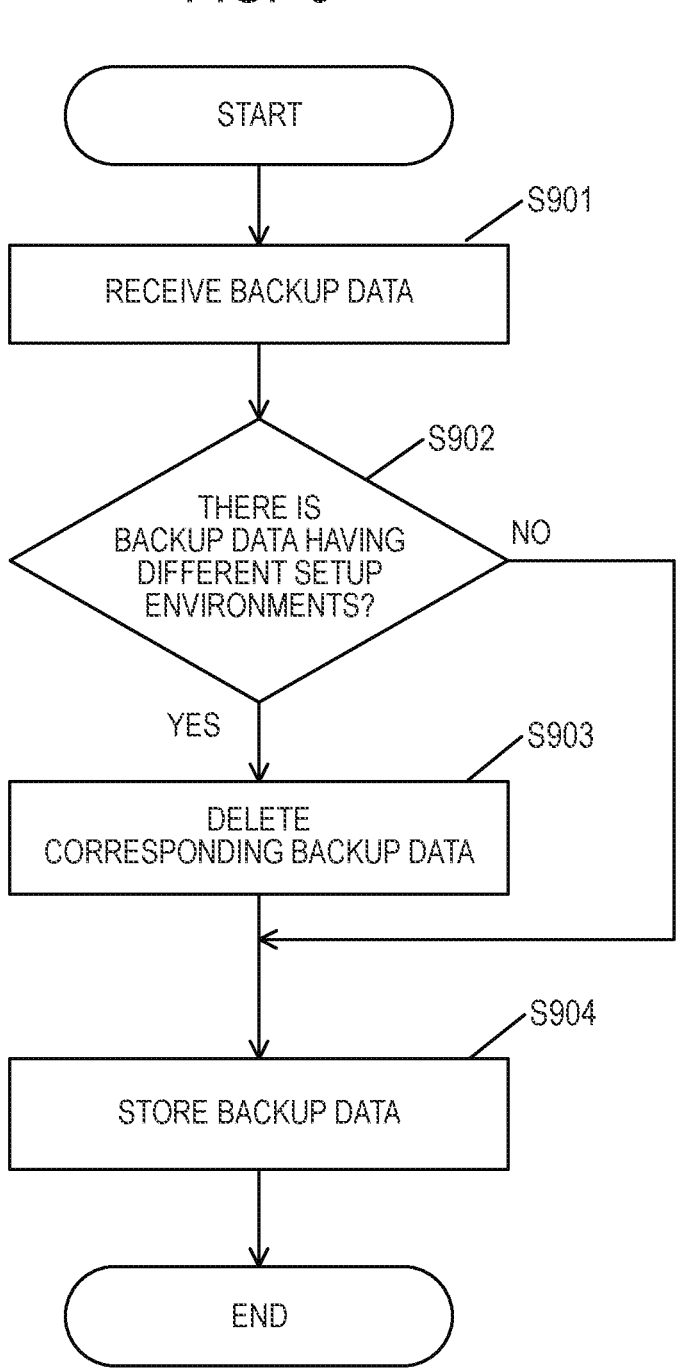
FIG. 9 is a flowchart showing processing of the backup management server according to one or more aspects of the present disclosure.

FIG. 9 is a flowchart showing an example of processing performed by the backup management server 104 according to the second embodiment. Each step in the present flowchart is realized by the CPU201 executing a program corresponding to each step stored in the ROM202.

In step S901, the data management unit 502 receives the latest backup database from the backup management unit 450, and the process proceeds to step S902.

In step S902, the data management unit 502 refers to the backup database 503 to determine whether or not backup data whose setup environment does not match a changed setup environment of the apparatus is stored. Specifically, the data management unit 502 acquires the serial number 610 and the setup environment ID 613 included in the backup data received in step S901. Then, the data management unit 502 refers to the backup database 503 to acquire a list of backup data associated with the acquired serial number. The data management unit 502 determines whether or not backup data having a setup environment ID different from that of the backup data received in step S901 is stored in the database. In case that backup data having the different setup environment ID is stored in the database (YES in step S902), the data management unit 502 advances the processing to step S903.

In step S903, on the basis of the determination in step S902, the data management unit 502 deletes the corresponding backup data (the backup data having a setup environment ID different from the ID of the backup data received in step S901) from the backup database 503. After the process step S903, the data management unit 502 advances the processing to step S904.

On the other hand, in case of the backup database 503 storing no backup data having a setup environment ID different from the ID of the backup data received in step S901 (NO in step S902), the data management unit 502 skips step S903 and advances the processing to step S904.

In step S904, the data management unit 502 stores the backup data received in step S901 in the backup database 503 and updates the backup management table. In case that a number of pieces of backup data having the same serial number and setup environment have reached the upper limit for storage (three pieces of past backup data in the above example), the data management unit 502 deletes the oldest data from among the backup data and stores new backup data.

FIG. 8B shows an example of the management table after applying the processes from step S901 to step S904 of FIG. 9 to the backup management table shown in FIG. 8A. In the example shown in FIG. 8B, a setup environment of the image forming apparatus 101 having a "SERIAL NUMBER: ABC00001" is changed, and backup data created in the environment before the change have been deleted.

In this example, since the setup environment ID of the backup data received in step S901 indicates "2", the backup data having a setup environment ID "3", which is different from the above ID "2", are deleted from the backup database 503.

The flow of the restoration processes according to the second embodiment will be described with reference to FIGS. 10 and 11.

Figure 10:
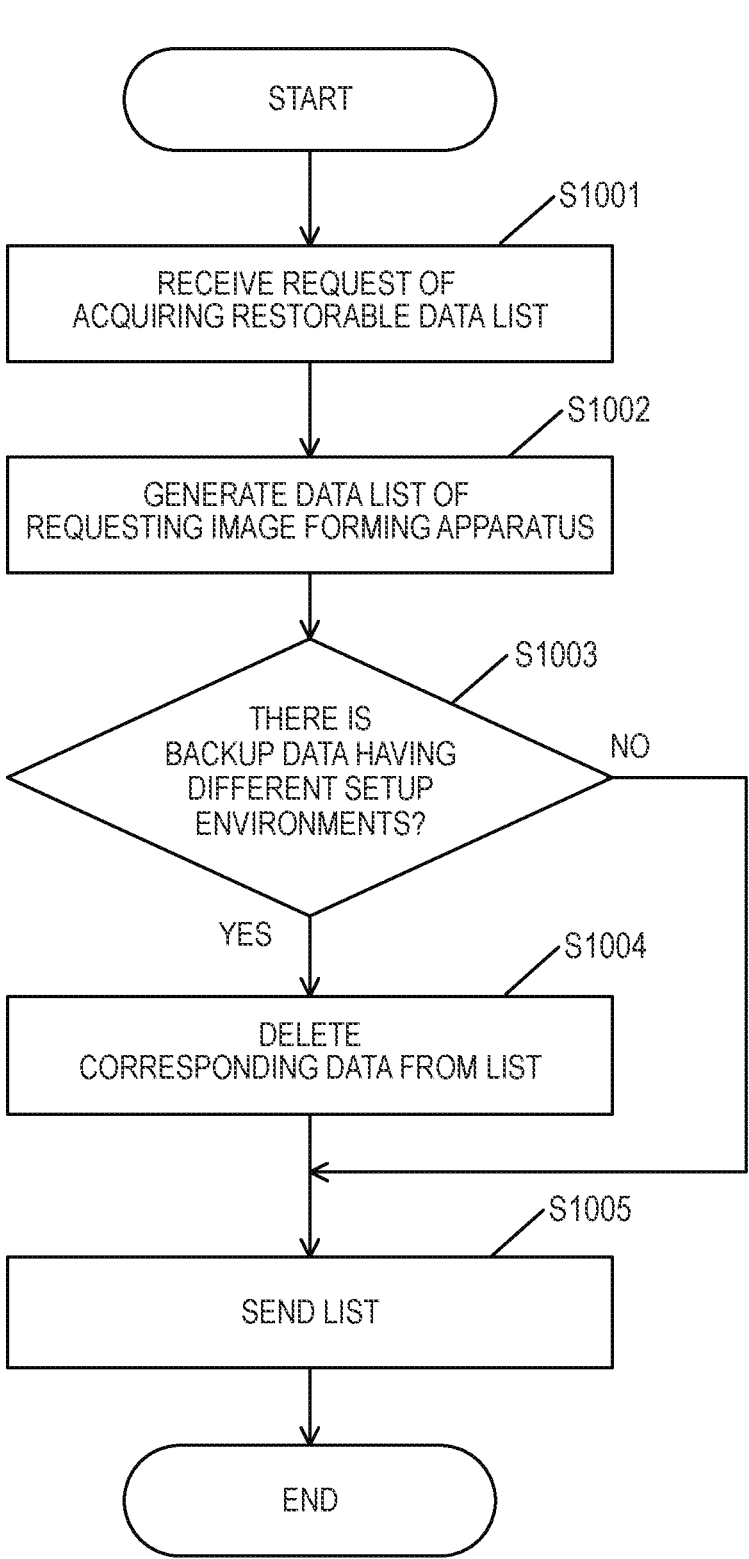
FIG. 10 is a flowchart showing restoration processes of the backup management server according to one or more aspects of the present disclosure.

FIG. 10 is a flowchart showing an example of restoration processes executed by the backup management server 104 of the second embodiment. Each step of the present flowchart is realized by the CPU201 executing a program corresponding to each step stored in the ROM202.

In step S1001, upon receiving a request of acquiring restorable data list from the backup management unit 450, the data management unit 502 advances the processing to step S1002. This request is transmitted when a user instructs to start the restoration processing via a screen displayed on the operation control unit 451 of the backup management unit 450. The restoration executing unit 454 acquires the current setup environment ID via the OF provision unit 440 based on a serial number of the image forming apparatus 101 operating the restoration executing unit 454 and includes the current setup environment ID in the request.

In step S1002, the data management unit 502 refers to the backup database 503 to acquire all backup data that match the serial number included in the request received in step S1001. The data management unit 502 includes the above backup data in a response list.

In step S1003, the management unit 502 determines whether the list created in step S1002 includes backup data whose setup environment does not match the setup environment included in the request received in step S1001. In case that the backup data whose setup environment does not match the setup environment included in the request received in step S1001 is included in the list (YES in step S1003), the management unit 502 advances the processing to step S1004.

In step S1004, the data management unit 502 deletes backup data from the response list based on the determination made in step S1003. The backup data that does not have the matched setup environment should have been deleted by the process of step S903 shown in FIG. 9. However, the deletion may fail due to some causes. The present process allows to further reduce a possibility of restoring the apparatus based on backup data that does not have the matched setup environment. After the process of step S1004, the data management unit 502 advances the processing to step S1005.

On the other hand, in case that the list includes no backup data that does not have the matched setup environment (NO in step S1003), the management unit 502 skips step S1004 and advances the processing to step S1005.

In step S1005, the data management unit 502 transmits the response list to the backup management unit 450. Upon receiving the response list, the restoration executing unit 454 of the backup management unit 450 displays a backup data selection screen on the operation unit 320 via the operation control unit 451, and outputs the contents of the list. An example of the output is shown in FIG. 11.

Figure 11:
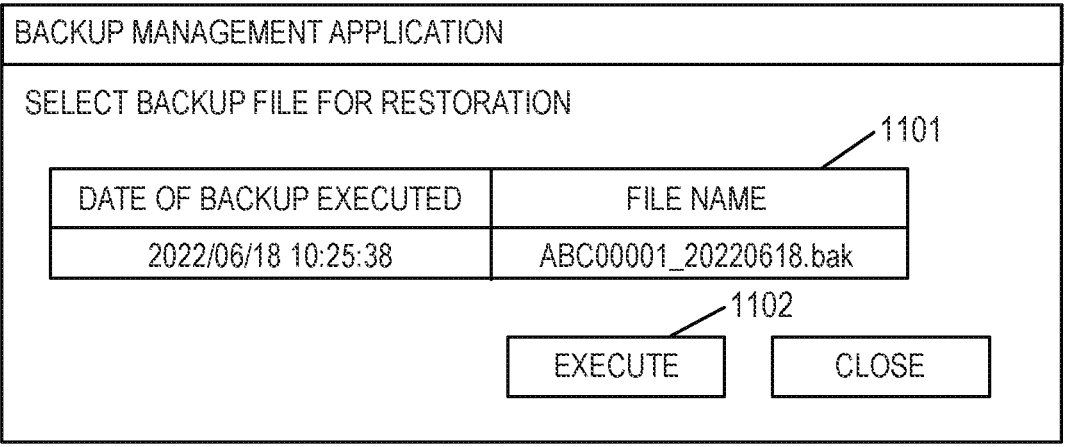
FIG. 11 is a backup data selection screen displayed by the backup management unit according to one or more aspects of the present disclosure.

FIG. 11 is a diagram showing an example of a backup data selection screen displayed by the backup management unit 450 of the second embodiment.

By the processing shown in FIGS. 9 and 10, only backup data corresponding to the current setup environment of the image forming apparatus 101 is displayed as a list in a backup data list 1101 of the backup data selection screen. In the example shown in FIG. 11, only one piece of backup data is displayed. However, in case that multiple pieces of backup data corresponding to the setup environment of the image forming apparatus 101 are stored in the backup management server 104, the multiple pieces of backup data are displayed.

The screen for selecting backup data shown in FIG. 11 includes the backup data list 1101 and an execution button 1102. The list 1101 is used by a user to select backup data for restoration. The user selects backup data for executing restoration from the backup data list 1101 and presses the button 1102. The operation control unit 410 of the image forming apparatus 101 detects user's operation and transmits information indicating a result of the selection by the user (for example, a file name) to the restoration executing unit 454. The restoration executing unit 454 downloads an entity file of the selected backup data from the backup management server 104 to execute the restoration process.

According to the second embodiment, in a case where multiple pieces of past backup data of the image forming apparatus are stored, it is possible to prevent a user from executing restoration based on backup data created in a previous setup environment before the setup environment changed. According to the present embodiment, it is possible to further reduce a possibility of the image forming apparatus being exposed to a threat of attack by the restoration processing.

As a modified example of the second embodiment, a response list including the setup environment ID for each backup data may be created in step S1002 of FIG. 10, and the response list created in step S1002 may be transmitted to the image forming apparatus 101 as a requesting source without executing the processes of steps S1003 and S1004. In the case of this modified example, the image forming apparatus 101 that has received the response list deletes options of the backup data having setup environment ID different from the current setup environment ID of the image forming apparatus 101 from the list among options of the backup data included in the list, and displays the list including no deleted options. That is, the image forming apparatus 101 displays, as options, only the backup data that has a setup environment ID matching the current setup environment ID of the apparatus in the backup data list 1101. This modified example can provide the same effects as the effects brought by the second embodiment described above.

According to the above-described embodiments, backup data of setting information is managed by a backup management server, and an image forming apparatus is used as an example of a network device. However, the network device is not limited to the image forming apparatus. For example, a network camera, various network home appliances, or the like may be used as the network device, and the setting information of these devices may be managed by the backup management server.

According to the respective embodiments, backup data can be managed and the restoration process can be executed based on the setup environment of a network device such as an image forming apparatus, a network camera, or various network home appliances and changes in the setup environment.

OTHER EMBODIMENTS

The present disclosure is not limited to the above embodiments, and various modifications are possible. For example, an example in which some of the configurations of any of the embodiments are added to other embodiments or an example in which some of the configurations of any of the embodiments are replaced with some of the configurations of other embodiments is also an embodiment of the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation to encompass all such modifications and equivalent structures and functions.

This application claims the benefit of Japanese Patent Application No. 2022-170910, filed on Oct. 25, 2022, which is hereby incorporated by reference herein in its entirety.

What is claimed is:

1. A device management system comprising:
   a network device; and
   a device management service that manages setting information including a plurality of setting values for the network device as backup data,
   wherein the network device includes:
   first one or more processors; and
   first at least one memory storing first executable instructions, which when executed by the first one or more processors, cause the network device to perform operations comprising:
   selecting a setup environment of the network device from a plurality of setup environments;

setting, for the network device, predetermined one or multiple setting values corresponding to the setup environment selected in the selecting; and transmitting, to the device management service, the setting information after being set in the setting and information of the setup environment selected in the selecting, wherein the device management service includes:

second one or more processors; and second at least one memory storing second executable instructions, which when executed by the second one or more processors, cause the device management service to perform operations comprising:

storing, in a storage, the setting information and the information of the setup environment as backup data of the network device, the setting information and the information of the setup environment being received from the network device, and wherein the first executable instructions, when executed by the first one or more processors, further cause the network device to perform operations comprising:

automatically creating new backup data based on current setting information, when the setup environment of the network device has changed, wherein the new backup data and information of the setup environment are transmitted to the device management service;

in a case where a restoration process of the network device is performed, displaying a list of backup data only corresponding to information of a current setup environment of the network device from among the backup data of the network device managed by the device management service; and acquiring, from the device management service, the setting information corresponding to backup data selected from the list to restore the network device.

2. The device management system according to claim 1, wherein the first executable instructions, when executed by the first one or more processors, further cause the network device to perform operations comprising:

setting, for the network device, the plurality of setting values included in the setting information acquired in the acquiring, and wherein the second executable instructions, when executed by the second one or more processors, further cause the device management service to perform operations comprising:

transmitting to the network device the setting information stored as the backup data of the network device in response to a request from the network device.

3. The device management system according to claim 2, wherein the first executable instructions, when executed by the first one or more processors, further cause the network device to perform operations comprising:

transmitting the information of the current setup environment of the network device to the device management service to acquire the list, and wherein the second executable instructions, when executed by the second one or more processors, further cause the device management service to perform operations comprising:

transmitting to the network device the list corresponding to the information of the setup environment received from the network device.

4. The device management system according to claim 1, wherein the predetermined one or multiple setting values corresponding to the setup environment include, as setting values associated with security, a setting value indicating whether to invalidate use of an external storage device based on the setup environment.

5. The device management system according to claim 1, wherein the network device is an image forming apparatus.

6. A method of controlling a device management system including a network device and a device management service that manages setting information including a plurality of setting values for the network device as backup data, the method comprising:

selecting, by the network device, a setup environment of the network device from a plurality of setup environments;

setting, for the network device, predetermined one or multiple setting values corresponding to the setup environment selected in the selecting;

transmitting, from the network device to the device management service, the setting information after being set in the setting and information of the setup environment selected in the selecting;

storing, by the device management service, the setting information and the information of the setup environment in a storage as backup data of the network device, the setting information and the information of the setup environment being received from the network device;

automatically creating new backup data based on current setting information, when the setup environment of the network device has changed, wherein the new backup data and information of the setup environment are transmitted to the device management service;

in a case where a restoration process of the network device is performed, displaying a list of backup data only corresponding to information of a current setup environment of the network device from among the backup data of the network device managed by the device management service; and acquiring, from the device management service, the setting information corresponding to backup data selected from the list to restore the network device.

7. The device management system according to claim 1, wherein the first executable instructions, when executed by the first one or more processors, further cause the network device to perform operations comprising:

after the predetermined one or multiple setting values had been set, determining whether a setup environment of the network device has been changed by the setup environment selected in the selecting;

automatically creating new backup data based on current setting information including the predetermined one or multiple setting values, when the setup environment of the network device has changed by the setup environment selected in the selecting, wherein the new backup data and information of the setup environment are transmitted to the device management service, and wherein new backup data is not created when the setup environment of the network device is not changed by the setup environment selected in the selecting.

* * * * *